(12) United States Patent
Hujer et al.

(10) Patent No.: US 8,002,250 B2
(45) Date of Patent: Aug. 23, 2011

(54) AIR SPRING AND SHOCK ABSORBER UNIT WITH OPERATOR CONTROL ELEMENT

(75) Inventors: Joachim Hujer, Grabenstetten (DE); Hans-Peter Krauss, Garbsen-Frielingen (DE)

(73) Assignees: Continental AG, Hannover (DE); Magura Gustav Magenwirth GmbH & Co. KG, Bad Urach (DE)

( * ) Notice: Subject to any disclaimer, the term of this patent is extended or adjusted under 35 U.S.C. 154(b) by 728 days.

(21) Appl. No.: 12/041,180

(22) Filed: Mar. 3, 2008

(65) Prior Publication Data

US 2008/0211149 A1  Sep. 4, 2008

(30) Foreign Application Priority Data

Mar. 2, 2007 (DE) .................. 10 2007 010 787

(51) Int. Cl.
 *F16F 9/04* (2006.01)
 *F16F 9/43* (2006.01)
 *F16F 9/54* (2006.01)

(52) U.S. Cl. ............... 267/64.28; 267/64.21; 188/322.2; 188/322.21

(58) Field of Classification Search .... 267/64.15–64.28; 188/289, 319.2, 322.2, 322.21
See application file for complete search history.

(56) References Cited

U.S. PATENT DOCUMENTS

| | | | | |
|---|---|---|---|---|
| 4,440,273 A | * | 4/1984 | Butler | 188/315 |
| 4,844,428 A | * | 7/1989 | Margolis et al. | 267/64.21 |
| 6,581,918 B2 | * | 6/2003 | Voelkel | 267/64.27 |
| 2004/0011613 A1 | * | 1/2004 | Vance et al. | 188/315 |

* cited by examiner

*Primary Examiner* — Bradley T King
*Assistant Examiner* — Vishal Sahni
(74) *Attorney, Agent, or Firm* — Laurence A. Greenberg; Werner H. Stemer; Ralph E. Locher

(57) ABSTRACT

An air spring and shock absorber unit for bicycles or motorbikes includes operator control elements which are accessible from the outside and are disposed on an outer surface of the air spring and shock absorber unit. The operator control elements are disposed so as to be rotatable about a common axis and relative to a position of articulation points.

18 Claims, 3 Drawing Sheets

AIR SPRING AND SHOCK ABSORBER UNIT WITH OPERATOR CONTROL ELEMENT

CROSS-REFERENCE TO RELATED APPLICATION

This application claims the priority, under 35 U.S.C. §119, of German Patent Application DE 10 2007 010 787.2-21, filed Mar. 2, 2007; the prior application is herewith incorporated by reference in its entirety.

BACKGROUND OF THE INVENTION

Field of the Invention

The invention relates to an air spring and shock absorber unit for running gear or suspensions of vehicles, in particular for bicycles, motorbikes or motorcycles, which is coupled to a vehicle frame or body of the vehicle by one articulation point, and to the running gear by another articulation point. A plurality of working spaces are disposed coaxially and can be connected to one another through valves. At least one of the working spaces is embodied as a spring suspension space partially bounded by a rolling bellows, and at least two further working spaces form a damping space, are separated by a piston which can be displaced in the damping space and can be connected through flow-through throttle valves in the piston. In that way, when the vehicle experiences spring compression and spring extension, air is exchanged as a working medium between the working spaces of the damping space and/or of the spring space. The air spring and shock absorber unit has operator control elements or actuators which are accessible from the outside.

While suspension and damping devices have long been standard equipment in motorbikes, suspension and damping systems have increasingly also become desired equipment features in non-motorized sporty bicycles for off-road use as well as in touring cycles over the last few years. In the past, mechanical or pneumatic suspension systems were almost exclusively used in conjunction with hydraulic shock absorbers.

Recently, such systems have been increasingly replaced by air spring and shock absorber units in which both the suspension and the damping are carried out by a gaseous medium. Such air spring and shock absorber units serve as particularly comfortable suspension elements in vehicles and provide a pleasant driving sensation with a suspension system which can be adapted between a "soft" and "hard" suspension behavior depending on the terrain or road conditions.

In the case of bicycles or bikes for off-road use, referred to as mountain bikes, the softest possible suspension and strong damping are required, for example, on downhill stretches, while hard suspension and the smallest possible degree of damping are required on straight-ahead sections of road with a firm underlying surface, in order to allow a maximum speed to be reached.

The adaptation between a "soft" and a "hard" suspension behavior is generally carried out in bicycles, in particular in non-motorized bicycles, through the use of manually activated or lever-activated adjustment elements in or on the air spring and shock absorber unit. In that case, the adjustment elements basically serve to change throttle cross sections in flow paths within the air spring and shock absorber units and/or to adjust corresponding throttle valves.

However, it is disadvantageous with the previous adjustment elements that, depending on the construction of the bicycle and the installation location and position of the air spring and shock absorber unit, those adjustment elements are often inaccessible or the air spring and shock absorber unit even has to be dismounted in order to adjust it. The same applies with respect to the valves for filling the air spring and shock absorber units which, of course, in the case of non-motorized bicycles without electrically driven compressors in the vehicle, have to be inflated with an external pump/hand pump from time to time.

SUMMARY OF THE INVENTION

It is accordingly an object of the invention to provide an air spring and shock absorber unit with an operator control element, which overcomes the hereinafore-mentioned disadvantages of the heretofore-known devices of this general type and in which required and externally accessible operator control elements thereof can be used and are accessible with any bicycle structure and in all installation locations, and therefore can be easily installed and operated. At the same time, such an air spring and shock absorber unit should also be simple and inexpensive to manufacture.

With the foregoing and other objects in view there is provided, in accordance with the invention, an air spring and shock absorber unit for running gear of vehicles. The air spring and shock absorber unit comprises an outer unit surface, one articulation point to be coupled to a frame or body of the vehicle, and another articulation point to be coupled to the running gear, a rolling bellows and a piston. A plurality of coaxial working spaces are to be mutually connected by valves. At least one of the working spaces is a spring space partially bounded by the rolling bellows. At least two others of the working spaces form a damping space. The at least two others of the working spaces are to be interconnected by flow-through throttle valves in the piston and mutually separated by the piston to be displaced in the damping space, for exchanging air as a working medium between the working spaces of the damping space and/or of the spring space, upon the vehicle experiencing spring compression and spring extension. At least one externally accessible operator control element is disposed on the outer unit surface for rotation about a common axis relative to a position of the articulation points.

In this context, the operator control elements are disposed on the outer surface of the air spring and shock absorber unit so as to be rotatable about the common axis and in relation to the position of the articulation points. This brings about rapid and easy-to-carry-out positioning of the operator control elements so that access from the outside can always be ensured. With such an embodiment, it also becomes possible to use one type of air spring and shock absorber unit for various types of bicycles, which benefits the principle of using identical parts in manufacture.

In accordance with another advantageous feature of the invention, a valve device for filling the air spring and shock absorber unit and an element for adjusting the damping are provided as externally accessible operator control elements. For example, an adjustment valve for adjusting at least one of the valves/throttle valves between the individual working spaces can be used in this case as an element for adjusting the damping. In this way, the two operator control elements which are used and required most often, can always be reached easily.

In accordance with a further advantageous feature of the invention, the operator control elements are disposed in a substantially concentric housing which is formed coaxially with respect to the working spaces or between at least two working spaces, wherein the housing is disposed so as to be rotatable in relation to the position of the articulation points. Such an embodiment simplifies the construction and improves it significantly with respect to length of service life/durability of the operator control elements which, of course, in this embodiment are no longer subjected as such to the mechanical loading arising from rotation but rather are disposed within a protective frame, specifically a housing, and are rotated with it.

Stepless rotatability through 360° can also be achieved in this case in a simple way as well as rotation entirely without the use of tools, provided that the housing has, for example, small projections or ribbing/roughening on the outer surface.

In accordance with an added advantageous feature of the invention, the housing with the operator control elements is disposed between the spring space which is partially bounded by a rolling bellows and the damping space which is divided into two working spaces by a piston. At this point on the air spring and shock absorber unit, virtually all of the connecting cross sections and valves can be reached so that the construction of the operator control element is simplified and at the same time the possibility is provided of already configuring the entire construction in advance in such a way that the respectively most effective engagement in the flow cross sections of the air spring and shock absorber unit is achieved.

In accordance with an additional advantageous feature of the invention, the housing with the operator control elements is permanently connected to the rolling bellows of the spring space, and the damping space is embodied as a hollow cylinder which is divided into two working spaces by a piston and is rotatably accommodated at one of its ends in the housing. This results in a particularly simple and inexpensive construction for the entire system of the air spring and shock absorber unit.

In accordance with yet another advantageous feature of the invention, the housing is embodied in a plurality of parts, preferably in the form of concentric rings which engage in one another, and in each case an operator control element is disposed on a separate housing part. In this way, individual operator control elements can be placed independently of one another in the respectively best position, i.e. the filling valve can be rotated in the direction of the ground and the throttle valve can be adjusted in the direction of the saddle. The same applies to a further advantageous development which resides in the fact that at least one of the operator control elements is disposed at the hollow cylinder or on a cylinder ring which can rotate with respect to the hollow cylinder and is connected to the latter.

In accordance with yet a further advantageous feature of the invention, the hollow cylinder has one of the articulation points, for example in the form of an eyelet which is accommodated within the frame of the bicycle, at its other end, and a piston rod is provided which is connected to the piston and which is disposed concentrically within a damping space and within the spring space and is connected to the other, i.e. the second, articulation point by the spring space and by a lid which closes off the spring space from the outside. The second articulation point is generally embodied in the form of an eyelet which is accommodated on the chassis rocker or on the fork of the bicycle. Such an embodiment reduces the necessary installation space for the air spring and shock absorber unit considerably, without adversely affecting functionality.

In accordance with yet an added advantageous feature of the invention, in addition, and within the sense of a further degree of freedom during installation, the articulation point which is disposed at the end of the hollow cylinder is embodied so as to be rotatable in relation to the hollow cylinder, or the piston rod which is connected to the piston, and the articulation point is rotatably mounted in the lid which closes off the spring space from the outside.

In accordance with yet an additional advantageous feature of the invention, the hollow cylinder, which is rotatably accommodated in the housing, is attached to the housing with a clamping connection, preferably with a union nut which is screwed to the housing. Together with the development of the clamping connection to the effect that the clamping connection can be released only if the spring and shock absorber unit is pressureless, the operator control elements remain in position while the bicycle is in use, and do not rotate. As a result, protection is also provided against unintentional or inadvertent rotation of the operator control elements out of the optimum position.

In accordance with again another feature of the invention, in this context, an easy-to-implement and very effective further advantageous embodiment resides in the fact that the clamping connection is embodied as a union nut which is screwed to the housing and which engages, with its set-back inner edge that surrounds the hollow cylinder, over a projecting shoulder of the outer periphery of the hollow cylinder and engages with its inner thread in an outer thread of a housing ring which protrudes axially between the union nut and the hollow cylinder. The thread pitch and the dimensions of the shoulder and inner edge are embodied in such a way that when the hollow cylinder is subjected to pressure loading, static friction is produced between the respective complementary contact faces. The static friction prevents manual rotation of the union nut and/or of the hollow cylinder. In order to rotate or re-position the operator control elements, the pressure must then firstly be let out of the system, after which the screw ring which is embodied as a union nut is slightly loosened and the housing with the operator control elements can be rotated. The union nut is then tightened again and the system pressurized, after which the operator control elements are secured again.

In accordance with again a further feature of the invention, in addition to stepless rotatability through 360°, it is appropriate and advantageous for certain applications if the housing is provided with latching elements, that is to say template rings or step rings for example, which restrict the rotatability of the operator control elements to at least two discrete positions. Through such an embodiment it is already possible to prevent, by virtue of the construction and on the basis of the installation position for example, the operator control elements from being rotated into the region of rotating parts on the bicycle, that is to say for example in the direction of the spokes of a wheel. This contributes to the users' safety.

In accordance with again an added advantageous feature of the invention, the element for adjusting the damping is constructed as an adjustment valve for adjusting tensile stage damping. This serves not only to meet a frequent request from the user who wishes to have adjustable, "slow" spring extension (tensile stage), but also to increase safety since in this case the damping in the compression stage, that is to say during the spring extension, which is more important for driving properties, cannot be adjusted.

In accordance with a concomitant advantageous feature of the invention, the lid which closes off the spring space from the outside is embodied as a rolling cone (rolling piston) with an outer rolling face for the rolling bellows. In this way, it is easily possible to influence and adapt the characteristic and progression of the air spring, in particular if replaceable shell elements are provided for the rolling cone for this purpose.

Other features which are considered as characteristic for the invention are set forth in the appended claims.

Although the invention is illustrated and described herein as embodied in an air spring and shock absorber unit with an operator control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
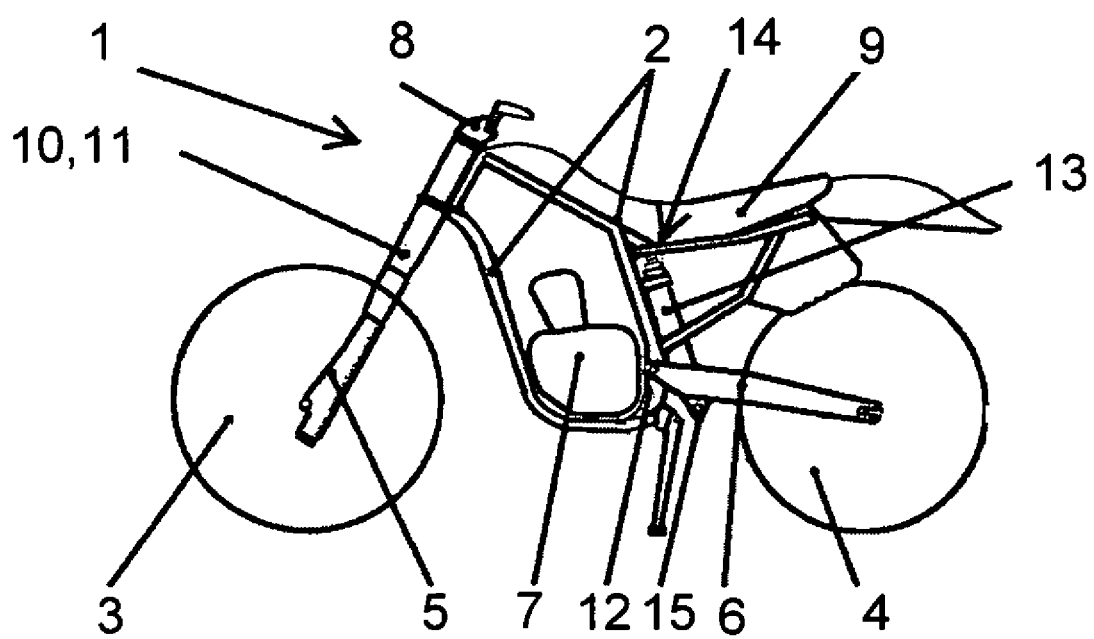
FIG. 1 is a diagrammatic, side-elevational view of a motorbike with an air spring and shock absorber unit according to the invention on a rear rocker.

Referring now to the figures of the drawings in detail and first, particularly, to FIG. 1 thereof, there is seen a diagrammatic illustration of a motorbike 1, basically including a frame 2, a front wheel 3 and a rear wheel 4, a front wheel fork 5, a rear rocker 6, a drive assembly 7, a steering and instrument unit 8 and a seat 9. The front wheel fork 5 guides and at the same time steers the front wheel 3, and the rear wheel rocker 6 guides the rear wheel 4. The "running gear" is therefore composed in this case basically of the front wheel fork 5 and the rear rocker 6.

An air spring and shock absorbing unit 10 or 11 from the prior art, which provides suspension and damping for shocks of the front wheel, is present as an integral component in the front wheel fork 5, in respective right-hand and left-hand fork branches. The rear wheel rocker 6 is pivotably coupled to the frame 2 through the use of a bearing 12 and is provided with suspension and damping with respect to oscillation excitations through the use of an air spring and shock absorbing unit 13 according to the invention.

The rear air spring and shock absorbing unit 13 is connected as an air spring and shock absorber unit according to the invention to the frame 2 at an upper articulation point or location 14 and to the rear wheel rocker 6 at a lower articulation point or location 15.

Figure 2:
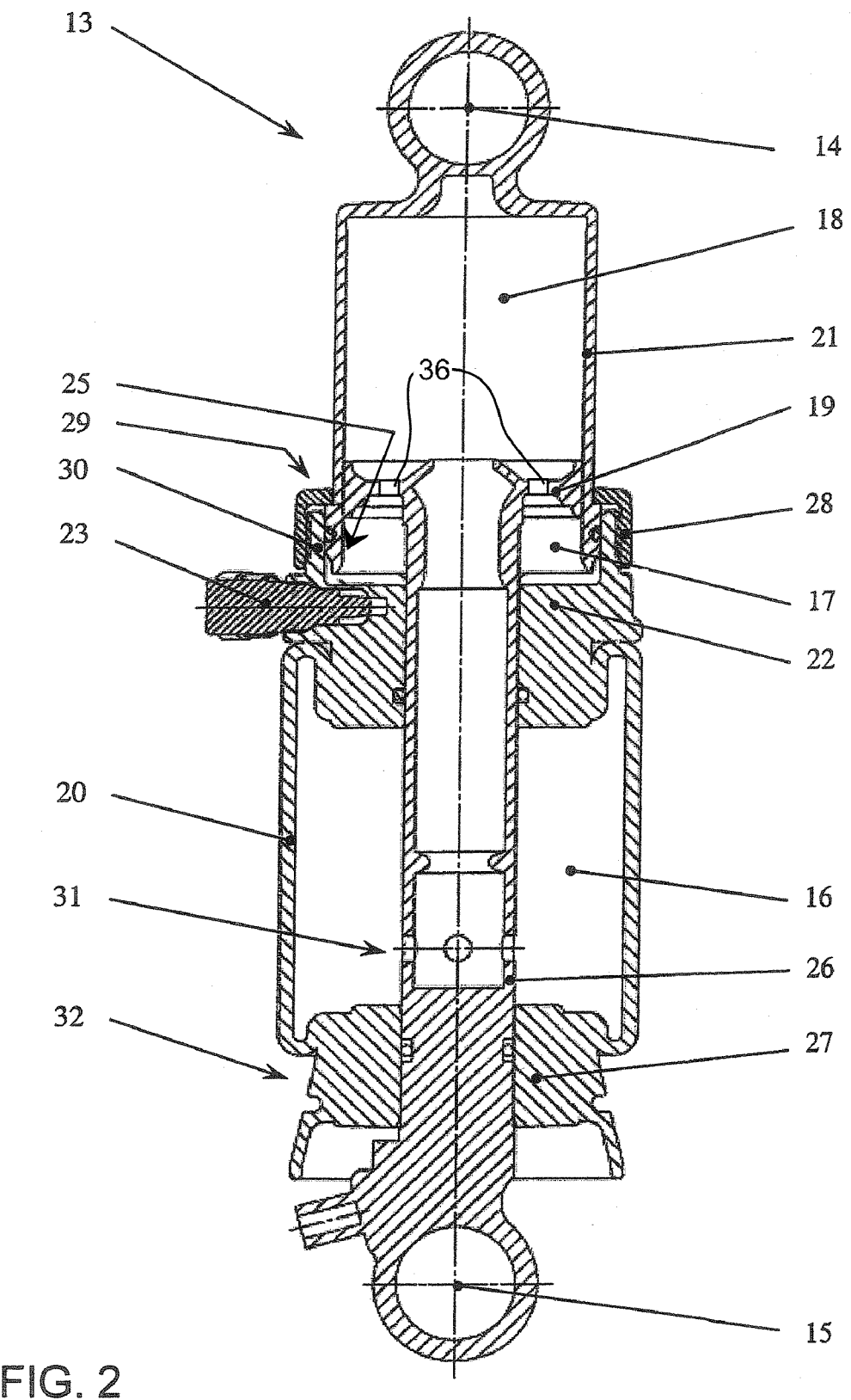
FIG. 2 is an enlarged, longitudinal-sectional view of the air spring and shock absorbing unit according to the invention with only the components which are important to the invention.

FIG. 2 shows a sectional view of the air spring and shock absorbing unit 13 according to the invention with only the components which are important to the invention.

The air spring and shock absorber unit 13 has three working spaces, specifically a lower working space 16 which is embodied as a spring space, a central working space 17 and an upper working space 18. The central working space 17 and the upper working space 18 are separated by a displaceable piston 19 and together form a damping space. Throttle valves 36, through which air can flow and through the use of which the working spaces 17 and 18 can be connected to one another, are disposed in the piston 19. During spring compression and extension of the vehicle, air is exchanged as a working medium between the working spaces 17 and 18 of the damping space, and the working space or spring or suspension space 16. In this case, the damping work is generated/absorbed by dissipation which occurs in the piston 19 due to the flow through the throttle valves. Meanwhile, the suspension is provided basically through the compression of the air in the working space 16, which is bounded partially, specifically in this case in the region of its cylindrical outer circumference, by rolling bellows 20.

The damping space, which is divided into the two working spaces 17 and 18 by the piston 19, is embodied as a hollow cylinder 21 and has, at its upper end, the articulation point or eyelet 14 which is permanently connected to the hollow cylinder 21 in this case and serves the purpose of attachment to the frame.

A substantially concentric housing 22 with operator control elements 23 and 24 is disposed between the spring space/working space 16, which is partially bounded by the rolling bellows 20 and the damping space or hollow cylinder 21, which is formed by the working spaces 17 and 18.

The housing 22, with the operator control elements 23 and 24 disposed on the outer spring and shock absorber unit surface thereof, is permanently connected to the rolling bellows 20 of the spring space/working space 16. The hollow cylinder 21 is accommodated at a lower end 25 thereof in the housing 22 in a rotatable manner.

A piston rod 26, which is connected to the piston 19, is disposed concentrically within the central working space 17 and within the lower working space/spring space 16. The piston rod 26 extends through a lid 27 which closes off the spring space from the outside and has the articulation point 15, which is connected to the rear wheel rocker 6 and is also embodied as an eyelet, at its end opposite the piston.

Since, in this embodiment, the piston rod 26 is also rotatably mounted in the lid 27 which closes off the spring space from the outside, the housing 22 and therefore the operator control elements 23 and 24 on the outer unit surface are therefore in their entirety disposed so as to be rotatable about a common axis, indicated by dot-dash lines, in relation to the position of the articulation points 14 and 15.

The hollow cylinder 21, which is rotatably accommodated in the housing 22, is attached to the housing with a union nut 28, which is screwed to the housing 22. The union nut 28 engages, with a set-back inner edge 29 thereof, which surrounds the hollow cylinder 21, over a projecting shoulder of the outer periphery of the hollow cylinder 21. The union nut 28 has an inner thread, which engages in an outer thread of a housing ring 30 that projects axially between the union nut 28 and hollow cylinder 21. A thread pitch and dimensions of the shoulder and the inner edge 29 are embodied in such a way that when the hollow cylinder 21 is subjected to pressure loading, static friction is produced between the respective complementary contact faces. That static friction prevents manual rotation of the union nut 28 and/or of the hollow cylinder 21. The connection between the hollow cylinder 21 and the housing 22, which is formed by the union nut 28, is therefore embodied in such a way that this connection can be released only if the air spring and shock absorber unit is pressureless.

With this construction of the air spring and shock absorber unit, there is a flow through all of the working spaces. Therefore, for example, the spring space/working space 16 is made smaller when spring compression occurs. As a result of the increase in pressure which takes place in this context, air flows through bores 31 and the hollow piston rod 26 firstly into the upper working space 18. After this, and when there is also a corresponding increase in pressure in this working space that is amplified, of course, by the piston 19 which is moved upward at the same time and reduces the size of the working space 18, the air flows through the throttle valves located in the piston 19 while taking up damping work through dissipation into the central working space 17, which becomes larger due to the piston movement during the spring compression. During the spring extension which takes place subsequently and when the central working space 17 then becomes smaller, the air then flows back again into the spring space/working space 16 through an adjustment valve, embodied as the operator control element 23, for adjusting tensile stage damping. The operator control element 24 is a valve device for filling the air spring and shock absorber unit.

During the spring compression and spring extension, the rolling bellows can roll on a rolling cone 32 which forms an outer contour of the lid 27 that closes off the spring space from the outside and can be adapted to the respectively desired shock absorber characteristic through shaping. The rolling cone, which is used in this case, has a cone angle of 13.5° and therefore gives the air spring a progressive characteristic curve, as a result of which the latter is suitable, in particular, for downhill use of off-road bicycles or bikes.

Figure 3:
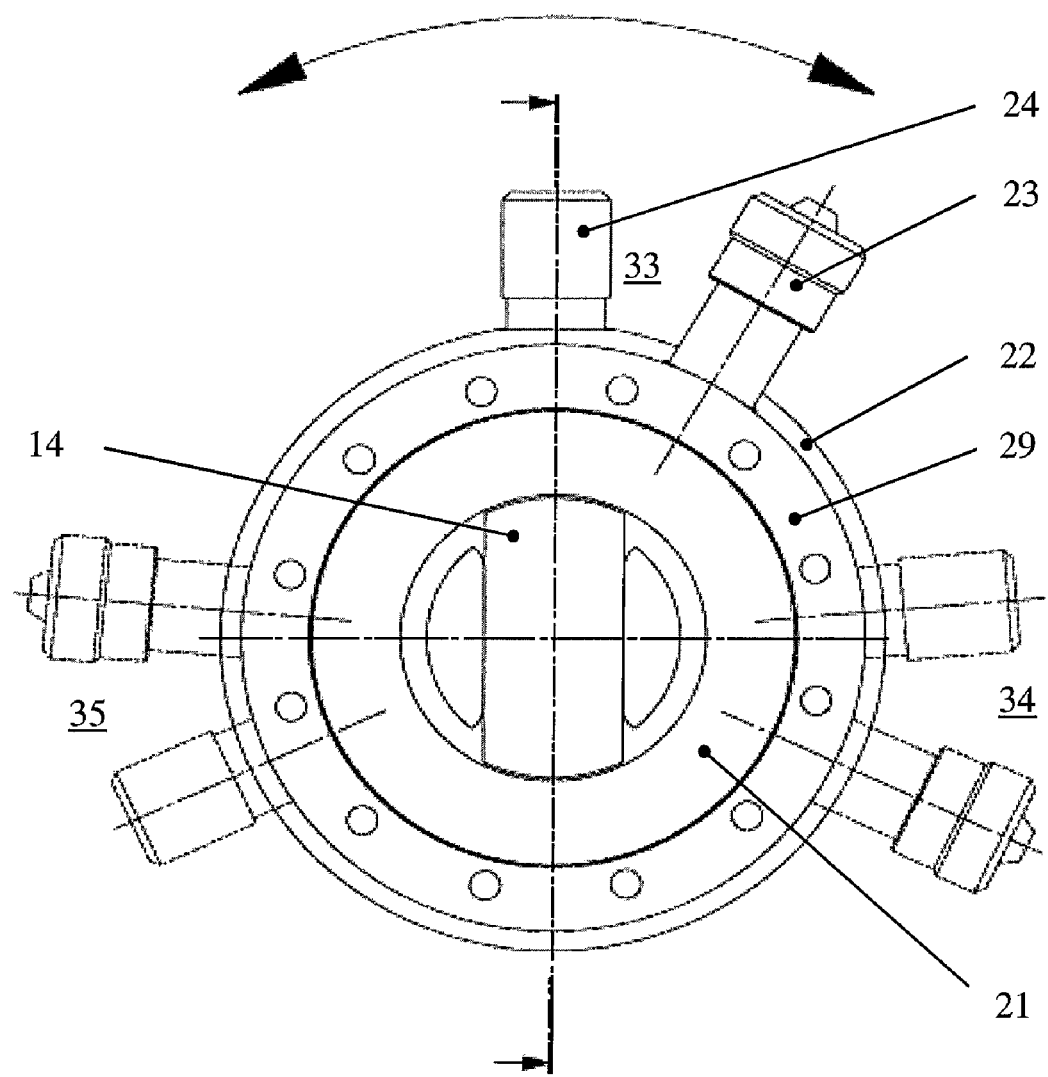
FIG. 3 is a plan view of an air spring and shock absorber unit according to the invention with latching elements on a housing.

FIG. 3 once more shows, for the sake of clarification, a view of an air spring and shock absorber unit 13 according to the invention, in which the housing 22 is provided with non-illustrated latching elements which are allocated on the inside and which limit the rotatability of the operator control elements 23 and 24 to three discrete positions 33, 34 and 35 that are also illustrated herein.

The invention claimed is:

1. An air spring and shock absorber unit for running gear of vehicles, the air spring and shock absorber unit comprising:
an outer unit surface;
one articulation point to be coupled to a frame or body of the vehicle, and another articulation point to be coupled to the running gear;
a rolling bellows;
a piston;
a plurality of coaxial working spaces to be mutually connected by valves, at least one of said working spaces being a spring space partially bounded by said rolling bellows, and at least two others of said working spaces forming a damping space, said at least two others of said working spaces to be interconnected by flow-through throttle valves in said piston and mutually separated by said piston to be displaced in said damping space, for exchanging air as a working medium between said working spaces of at least one of said damping space or said spring space, upon the vehicle experiencing spring compression and spring extension;
a substantially concentric housing disposed between said spring space and said damping space so as to be rotatable relative to the position of said articulation points; and
at least one externally accessible operator control element disposed in said housing on said outer unit surface for rotation about a common axis of the air spring and shock absorber unit relative to a position of said articulation points.

2. The air spring and shock absorber unit according to claim 1, wherein the vehicle is a bicycle or motorbike.

3. The air spring and shock absorber unit according to claim 1, wherein said at least one externally accessible operator control element includes at least one of a valve device for filling the air spring and shock absorber unit or an element for adjusting damping.

4. The air spring and shock absorber unit according to claim 1, wherein said housing with said at least one operator control element is permanently connected to said rolling bellows of said spring space, and said damping space is a hollow cylinder being divided into two of said working spaces by said piston and having one end rotatably accommodated in said housing.

5. The air spring and shock absorber unit according to claim 1, wherein said housing has a plurality of parts, and each said at least one operator control element is disposed on a separate respective one of said parts.

6. The air spring and shock absorber unit according to claim 5, wherein said parts are concentric rings engaging in one another.

7. The air spring and shock absorber unit according to claim 4, wherein at least one operator control element is disposed at said hollow cylinder.

8. The air spring and shock absorber unit according to claim 7, which further comprises a cylinder ring to be rotated relative to said hollow cylinder and being connected to said hollow cylinder, said at least one operator control element being disposed on said cylinder ring.

9. The air spring and shock absorber unit according to claim 4, which further comprises a lid closing off said spring space from the outside, and a piston rod connected to said piston and disposed concentrically within said damping space and within said spring space and being connected to said other articulation point by said spring space and by said lid, said hollow cylinder having another end with said one articulation point.

10. The air spring and shock absorber unit according to claim 9, wherein said one articulation point disposed at said other end of said hollow cylinder is rotatable relative to said hollow cylinder.

11. The air spring and shock absorber unit according to claim 9, wherein said piston rod connected to said piston and to said other articulation point is rotatably mounted in said lid closing off said spring space from the outside.

12. The air spring and shock absorber unit according to claim 4, which further comprises a clamping connection attaching said hollow cylinder, rotatably accommodated in said housing, to said housing.

13. The air spring and shock absorber unit according to claim 12, wherein said clamping connection is a union nut screwed to said housing.

14. The air spring and shock absorber unit according to claim 12, wherein said clamping connection is releasable only if the spring and shock absorber unit is pressureless.

15. The air spring and shock absorber unit according to claim 12, which further comprises:
a housing ring protruding axially between said clamping connection and said hollow cylinder and having an outer thread;
said hollow cylinder having an outer periphery with a projecting shoulder;
said clamping connection being a union nut screwed to said housing, said union nut having a set-back inner edge surrounding said hollow cylinder and engaging over said projecting shoulder, and said union nut having an inner thread engaging said outer thread of said housing ring; and
said shoulder and said inner edge having a thread pitch and dimensions causing static friction to be produced between respective complementary contact faces upon said hollow cylinder being subjected to pressure loading, said static friction preventing manual rotation of at least one of said union nut, said hollow cylinder or said housing.

16. The air spring and shock absorber unit according to claim 1, wherein said housing has latching elements restricting rotatability of said at least one operator control element to at least two discrete positions.

17. The air spring and shock absorber unit according to claim 3, wherein said element for adjusting damping is an adjustment valve for adjusting tensile stage damping.

18. The air spring and shock absorber unit according to claim 9, wherein said lid closing off said spring space from the outside is a rolling cone with an outer rolling face for said rolling bellows.

* * * * *